Figure 1:
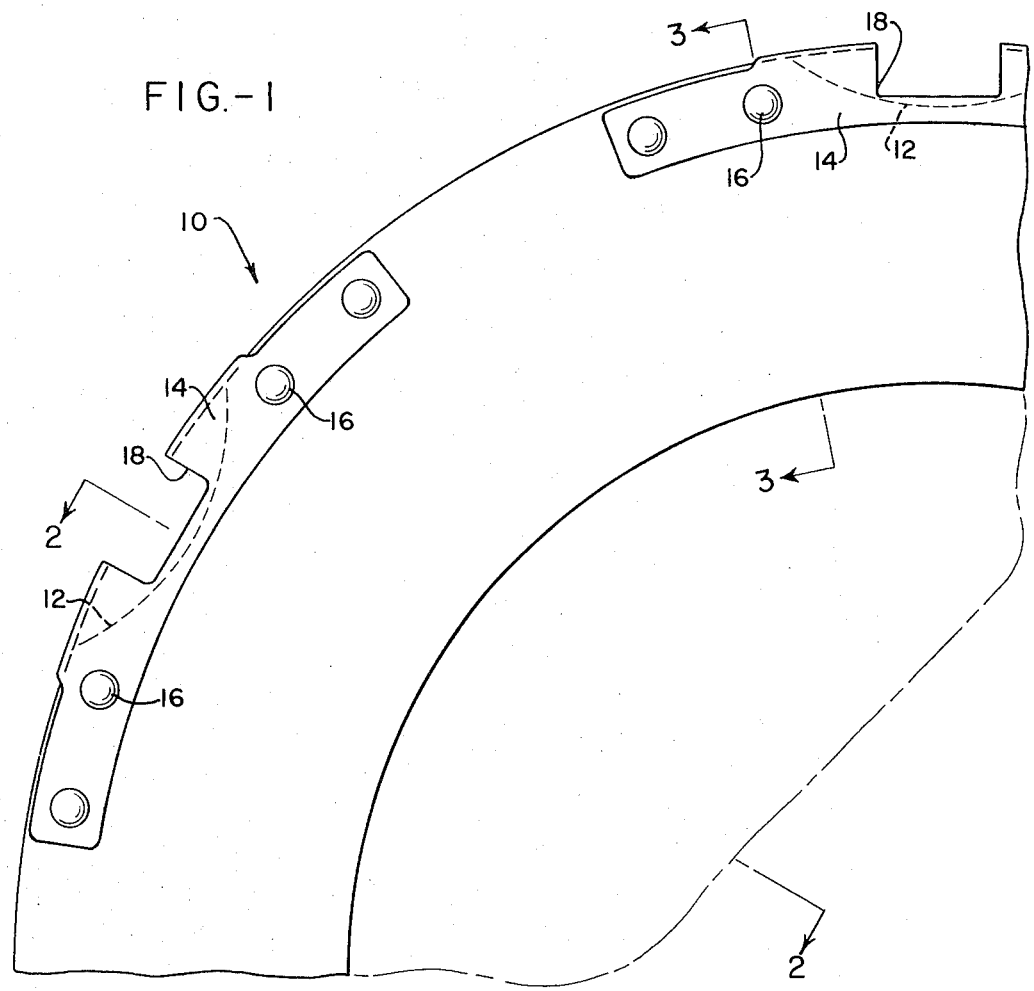

United States Patent [19]
Cook et al.

[11] 3,800,392
[45] Apr. 2, 1974

[54] GRAPHITE AND/OR CARBON DISK WITH REMOVABLE WEAR FACES

[75] Inventors: Albert W. Cook, Tallmadge; Joseph F. Dernovshek, Akron, both of Ohio

[73] Assignee: The Goodyear Tire & Rubber Company, Akron, Ohio

[22] Filed: Oct. 20, 1972

[21] Appl. No.: 299,369

Related U.S. Application Data
[62] Division of Ser. No. 87,126, Nov. 5, 1970, Pat. No. 3,712,427.

[52] U.S. Cl. ........... 29/401, 188/73.2, 188/218 XL, 192/70.13, 192/107 R
[51] Int. Cl. ............................................ B22d 19/10
[58] Field of Search .................... 188/73.2, 218 XL; 192/107 R, 70.13; 29/401

[56] References Cited
UNITED STATES PATENTS

| | | |
|---|---|---|
| 2,594,810 | 4/1952 | Schaub et al. ........................ 29/401 |
| 2,655,237 | 10/1953 | Benson ........................... 188/71.6 X |
| 2,902,130 | 9/1959 | Halberg et al. ..................... 188/73.2 |
| 3,480,115 | 11/1969 | Lallemant ........................... 188/71.5 |
| 3,552,533 | 1/1971 | Nitz et al. ................... 188/251 A X |
| 3,650,357 | 3/1972 | Nelson et al. ....................... 188/71.5 |

*Primary Examiner*—George E. A. Halvosa
*Attorney, Agent, or Firm*—F. W. Brunner; P. E. Milliken; E. W. Oldham

[57] ABSTRACT

The invention comprises a brake disk assembly in the form of a carbon or graphite disk which is provided on both sides with thin wear plates of carbon or graphite material. The plates are either in segmented or full circle form and are secured to the core by rivets and bushings which also secure the keyway drives of the disks.

1 Claim, 6 Drawing Figures

GRAPHITE AND/OR CARBON DISK WITH REMOVABLE WEAR FACES

This application is a divisional application of Ser. No. 87,126, filed Nov. 5, 1970, now U.S. Pat. No. 3,712,427.

This invention relates to brake assemblies of the type having alternate rotating and stationary brake disks carried between and axially movable between a backing plate and a pressure plate. More particularly, the invention relates to an improved brake disk for use in such an assembly.

With carbon or graphite brake disks of the prior art the entire assembly must be discarded when the surfaces of the disk have become sufficiently worn. This, however, involves the discarding of a disk which is still structurally sound, and the replacement with a new assembly is extremely expensive.

It is the primary object of the invention to provide a graphite or carbon brake disk in which the wear surfaces of the disk may be renewed or refurbished without requiring the discarding of the entire assembly, thus realizing a considerable cost saving in replacement over the prior art disk assemblies.

In the present invention this object is achieved by providing on a carbon or graphite disk core renewable wear surface disks which may be of the same material as the core which are mechanically secured to the core and which may be provided for a worn disk, replaced themselves, as necessary, and all without requiring the discarding of the entire base disk assembly. The wear surfaces are secured by the bushings and rivets which hold the keyway drives to the disks.

A further object of the invention is to provide a method to effect refurbishment so that disks can have great longevity, and replacement can be made at minimum cost.

For a more complete understanding of the invention and of the objects and advantages thereof, reference should be had to the following specification and the accompanying drawings wherein there is shown a preferred embodiment of the invention.

Figure 2:
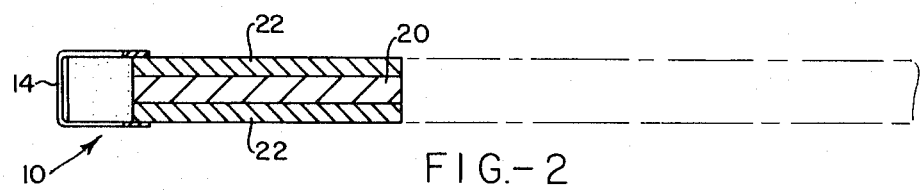
Figure 3:
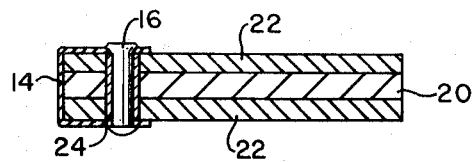
Figure 4:
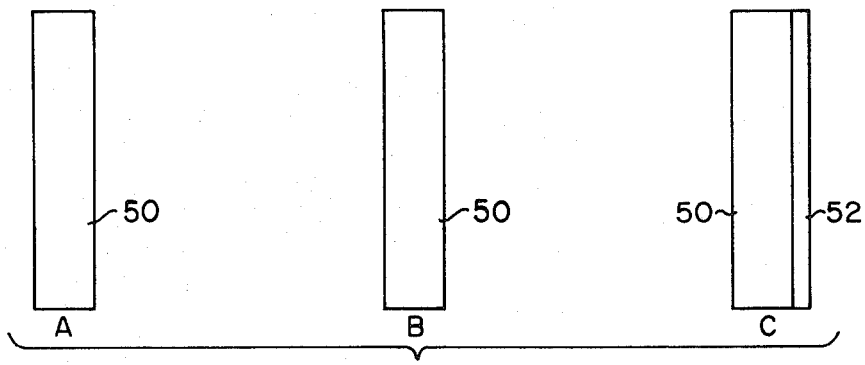
Figure 5:
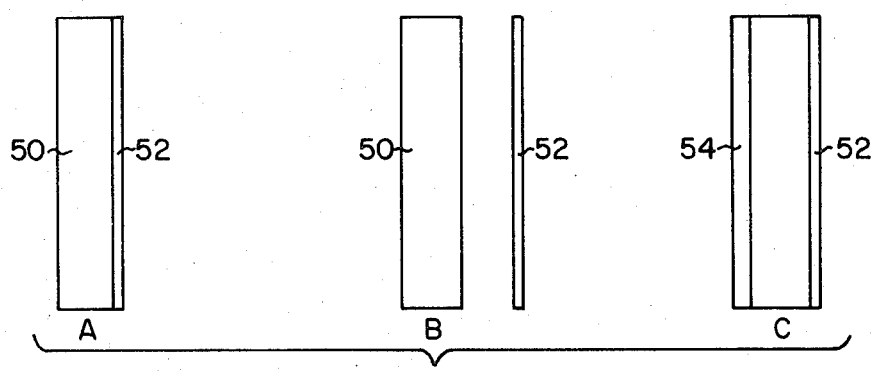
Figure 6:
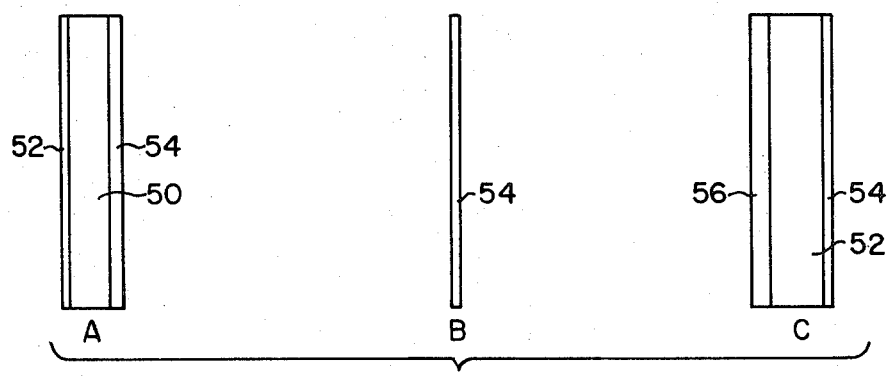

In the drawing:

FIG. 1 is a fragmentary side elevational view of a brake disk constructed in accordance with the present invention, the disc shown being a rotating disk;

FIGS. 2 and 3 are fragmentary sectional views taken along the lines 2—2 and 3—3, respectively, of FIG. 1 and showing the arrangement by which the wear plates are attached to the disk core; and FIGS. 4, 5 and 6 represent the method of refurbishment of a new solid disk for the first, second, and third refurbishment, respectively.

The reference numeral 10 designates generally a brake disk which is in the form of an annular ring and which is provided at uniformly spaced intervals on its outer circumference with slots 12. Keyway drives 14 are secured to the annular disk at each of the slots 12 and held in place by rivets 16. Each of the keyway drives 14 includes a notch 18 for receiving the splines or keys of a rotating wheel assembly so that the disks are rotated with the wheel while being capable of axial movement relative to the wheel.

As is shown in FIGS. 2 and 3, the disk 10 is formed of a core disk 20 which is of a graphite or carbon base material and of wear plates 22 on each face of the core 20. The wear plates 22 may be of the same graphite or carbon base material as the core plate 20 and may be either in the form of annular rings of the same size as the core 20 or in the form of segmented rings each forming a part of the annular ring. The wear plates 22 may, however, be of a graphite or carbon base designed to provide greater frictional and heat sink capabilities, but not as great a structural capability as the core plate 20. Preferably, the core plate 20 will have good resistance to oxidation and great structural strength. The core plate 20 should be a minimum of 1 ½ times the thickness of each respective wear plate 22. The wear plates 22 may be full circle or segmented as long as the segments are secured at both ends by rivets or other appropriate means. In either event, the wear plates 22 are mechanically secured to the core 20 by means of the rivets 16 which secure the keyway drives 14 in place. The rivets 16 are not positioned within the rubbed face of the plates 22 and hence the plates 22 may be quite thin. Bushings 24 are provided on the rivets 16 to uniformly distribute the forces between the wear plates 22 and the core plate 20. The wear plates 22 may, for example, be of from 0.075 to 0.175 inches thick. The overall thickness of the disk assembly may typically be between 0.400 and 0.600 inches.

When the wear plates 22 become sufficiently worn that they must be replaced, it is merely necessary to remove the rivets 16, the bushings 24 and the keyway drives 14. The worn wear plates 22 are now discarded and new wear plates placed on either side of the core 20. The keyway drives 14 are again riveted in place with the bushings 24 and the rivets 16 thus securing the new wear plates 22 to the core 20. The brake disk 10 is thus renewed and capable of being reused. Since the wear plates 22 are relatively thin only a small amount of carbon or graphite material is actually discarded, the core 20 which forms the bulk disk being reused.

It should be understood that while the disk illustrated and described above is a rotating disk having the keyway drives 14 and keyway slots 18 on its outer circumference, the principles of the invention may be as advantageously employed in a stationary brake disk, or one in which the keyway drives and keyway slots are provided along the inner circumference of the disk.

The method of the invention includes a way to refurbish carbon disks including the pressure and end plates. The low coefficient of thermal expansion and other desirable properties such as the high heat transfer coefficient make a carbon base material ideal from this standpoint. By refurbish, it is meant to take an initial solid carbon disk, and refurbish it according to the techniques defined hereinafter. The technical feasibility of refurbishing has been proved by laboratory dynamic brake testing. Specifically, after the disks went through a specified brake life, they were refurbished and run through a required dynamic brake test the second time to determine if the same characteristics were present.

FIGS. 4, 5, and 6 represent the refurbishment cycle which is believed to represent the optimum procedure. The first refurbishment is illustrated in FIG. 4 which shows in view A a brake disk indicated by numeral 50 which has been form about 0.060 so that for a rotating disk it would have a thickness of about 0.480 inches and for a stationary disk about 0.520 inches. The refurbishment technique in its first step will constitute grinding both faces of the disk 50 enough to smooth it and provide parallel opposite surfaces, or about 0.030 so that for a rotating disk the thickness would be approximately 0.450 inches and for a stationary disk the thickness would be about 0.490 inches. The initial thickness is then achieved by refurbishing with a carbon plate or disk 52 as indicated in view C of FIG. 4 that is approximately 0.150 inches in thickness to thereby increase the overall disk thickness by that amount, hence bringing the total disk thickness up to the desired pre-worn condition. The plate 52 is attached in the manner as illustrated in FIGS. 1 through 3, but is attached only on one side as indicated in view C of the FIG. 4.

When the disk 50 and plate 52 have again worn as indicated in view A of FIG. 5 to approximately the same thickness dimensions as in view A of FIG. 4, both the disk 50 and plate 52 are ground to the dimensions indicated in view B, with a new plate 54 being added as in view C to complete the refurbishing of the disk and the return to its initial thickness dimensions. Note, however, that plate 52 is only approximately one-half the thickness of plate 54. This completes the second refurbishing with a structure which now has two wear plates 52 and 54 of different thickness configurations.

The third refurbishment and all subsequent refurbishments are illustrated in FIG. 6 where view A illustrates the worn disk 50 and plates 52 and 54. View B illustrates the grinding of plate 54 while view C illustrates the positioning of a new plate 56 in combination with plate 54 to achieve the complete refurbishing. In this instance, plate 52 has been discarded because it has worn to such a thin thickness that it is no longer structurally usable. Note, however, that the base disk 50 remains at the same thickness during the third refurbishment and, of course, for all refurbishments thereafter.

While in accordance with the Patent Statutes, only the best known embodiment of the invention has been described and illustrated in detail it will be understood that the invention is not so limited. Reference should therefore be had to the appended claims in determining the true scope of the invention.

What is claimed is:

1. A method for refurbishing a worn brake disk assembly comprising an annular core of a carbon base material having a plurality of keyway drives separate and independent from said core secured at uniformly spaced intervals on one circumference of the core which comprises the following steps:
  1. removing said keyway drives from the core,
  2. grinding down the worn opposite surfaces of the core to a smooth parallel configuration;
  3. placing a plate of substantially the same material as the core but of less thickness fully covering one of the sides thereof;
  4. adding a second plate of the same material as the core and the first thin plate to the other side of the disk; and
  5. securing the keyway drives, thin plates, and annular core as a unit, which core and both plates in combination provide a desired thickness.

* * * * *